United States Patent [19]

Feola et al.

[11] Patent Number: 5,409,972
[45] Date of Patent: Apr. 25, 1995

[54] PROCESS FOR THE PREPARATION OF MODIFIED AMINOALKYLATION PRODUCTS AND CATIONIC PAINT BINDERS MADE BY THE PROCESS

[75] Inventors: Roland Feola; Willibald Paar; Georg Pampouchidis; Johann Gmoser; Helmut Hönig, all of Graz, Austria

[73] Assignee: Vianova Kunstharz, A.G., Werndorf, Austria

[21] Appl. No.: 879,427

[22] Filed: May 7, 1992

[30] Foreign Application Priority Data

May 7, 1991 [AT] Austria ................................. 946/91
Mar. 10, 1992 [AT] Austria ................................. 461/92

[51] Int. Cl.⁶ ........................................ C08K 3/20
[52] U.S. Cl. ................................. 523/404; 523/415; 523/416; 525/452; 525/489; 525/490; 525/528; 525/901; 528/45; 528/73
[58] Field of Search ............... 523/404, 415, 416; 525/490, 528, 489, 452; 524/901; 528/45, 73

[56] References Cited

U.S. PATENT DOCUMENTS

| | | | |
|---|---|---|---|
| 4,134,932 | 1/1979 | Kempter et al. | 525/528 |
| 4,711,934 | 12/1987 | Paar et al. | 525/528 |
| 4,711,937 | 12/1987 | Paar | 525/528 |
| 4,777,225 | 11/1988 | Paar | 525/528 |

Primary Examiner—Frederick Krass
Attorney, Agent, or Firm—Breiner & Breiner

[57] ABSTRACT

This invention relates to a process for the preparation of self-crosslinking cationic paint binders which can be diluted with water after protonation and are based on modified aminoalkylation products of phenols; to the binders prepared by this process and to their use for formulating water-dilutable paints, in particular electrodeposition paints which can be deposited cathodically. The process is characterized in that an aminoalkylation product of a phenol containing at least one secondary amino group is reacted with epoxide compounds, and after temperature treatment, the reaction product is reacted with partly blocked isocyanate compounds. The process permits the use of blocking agents which allow stoving temperatures in the range of 130 to 150° C.

15 Claims, No Drawings

PROCESS FOR THE PREPARATION OF MODIFIED AMINOALKYLATION PRODUCTS AND CATIONIC PAINT BINDERS MADE BY THE PROCESS

FIELD OF INVENTION

This invention relates to a process for the preparation of self-crosslinking cationic paint binders which can be diluted with water after protonation based on modified aminoalkylation products of phenols, to the paint binders and to their use in paints.

BACKGROUND OF INVENTION

A process for the preparation of self-crosslinking cationic paint binders which can be diluted with water after protonation and are obtained by reaction of an aminoalkylation product, containing secondary amino groups, of a phenol with a semi-blocked diisocyanate and subsequent reaction of the phenolic hydroxyl groups with epoxide compounds is disclosed in EP-B1-0 209 857. The products described can be used to formulate paints, the films of which, after stoving, have excellent corrosion-protection properties such as are required, for example, by the automobile industry. However, because of the reaction procedure, the process does not allow for the use of blocking agents for isocyanate groups which can be split-off at a temperature of below 140° C. The temperatures of at least 95° C. required in the aforesaid process for the reaction of the epoxide compounds with the phenolic hydroxyl groups leads to uncontrollable reactions, which may cause gelling of the reaction charge, when such blocking agents are used. Paints based on the binders according to EP-B1-0 209 857 thus require stoving temperatures above 150° C., preferably of 160° C. or more, in order to achieve the required film properties. Moreover, relatively highly viscous products are obtained by the disclosed process, which on the one hand necessitates the simultaneous use of relatively large amounts of organic auxiliary solvents, and on the other hand makes deposition of relatively high coating thicknesses difficult in an electrocoating process.

SUMMARY OF INVENTION

It has now been found that the disadvantages of the products prepared in accordance with EP-B1-0 209 857 can be overcome by a change to the process without having the advantageous overall profile of the properties of the binders impaired. The invention, therefore, relates to a process for the preparation of self-crosslinking cationic paint binders which can be diluted with water after protonation which are based on modified aminoalkylation products of phenols, characterized in that (1) an aminoalkylation product containing on average at least one NH-group per molecule which is obtained from 1 mol of a monoalkylphenol and/or of a monoarylphenol and/or of a monoarylalkylphenol having at least one phenolic hydroxyl group (having, preferably, one phenolic hydroxyl group or if appropriate two phenolic hydroxyl groups); from 1 to 2 mol of a primary alkylamine and/or primary alkanolamine and/or primary-tertiary alkyl-diamine and from an amount of formaldehyde equimolar to the primary amino groups, (2) is reacted with an amount of an aliphatic and/or aromatic diepoxide compound and, if appropriate, of a monoepoxide compound equivalent to the secondary amino groups present, (3) 50 to 100 mol%, preferably 95 to 100 mol%, of the phenolic hydroxyl groups are subsequently or simultaneously reacted with a monoepoxide compound, preferably with an aliphatic monoepoxide compound, (4) after complete reaction of the epoxide groups, the reaction charge is kept at a temperature of 100 to 130° C., preferably 115 to 125° C., until a viscosity minimum is reached, and finally (5) a proportion or all of the secondary hydroxyl groups of the reaction product are reacted with semi-blocked diisocyanates or other polyisocyanate compounds containing a free NCO-group.

The invention furthermore relates to the products prepared by this process and to their use, if appropriate, in combination with additional crosslinking components and/or binder components carrying hydroxyl groups, for formulation of paints which can be diluted with water, in particular electrodeposition paints which can be deposited cathodically.

The aminoalkylation products of phenols which are suitable for the process according to the invention are prepared by methods which are known from the literature, for example in accordance with Houben Weyl, *Methoden der organischen Chemie (Methods of Organic Chemistry)*, Volume XI/1 (1957).

The phenols employed according to the invention are substituted phenols, such as monoalkylphenols, the alkyl radicals of which preferably contain at least 4 carbon atoms. Representatives of this group are the ortho- and para-butylphenols, and their higher homologues. Arylphenols, such as phenylphenol, or arylalkylphenols, such as bisphenol A, can also be used.

1 to 2 mol of a primary monoalkylamine, such as butylamine or its isomers and homologues, and/or of a primary alkanolamine, such as monoethanolamine or homologues thereof, and/or of a primary-tertiary alkyldiamine, such as dimethylaminoethylamine or diethylaminopropylamine, and an amount of formaldehyde equimolar to the primary amino groups are employed per mol of phenol.

The aminoalkylation is carried out by heating the batch containing the components in the presence of a solvent which forms an azeotrope with water, such as toluene, to the temperature necessary for azeotropic removal of the water of reaction, taking into account any exothermic reaction.

After the calculated amount of water has been removed, the reaction product thus obtained, which contains on average at least one secondary amino group per molecule, is diluted with an aprotic solvent, if appropriate, and is reacted in the next reaction stage with an amount of aliphatic and/or aromatic diepoxide compound equivalent to the secondary amino groups. If appropriate, the amount of secondary amino groups present in excess of 1 equivalent can also be reacted with monoepoxide compounds.

Commercially available epoxy resins, for example based on bisphenol A or on polyols, are used as the diepoxide compounds. These compounds preferably have an epoxide equivalent weight of 180 to 1000. Glycidyl esters of monocarboxylic acids, in particular those of so-called KOCH acids, and glycidyl ethers, such as 2-ethylhexyl glycidyl ethers, are employed as monoepoxide compounds.

The reaction is carried out at 95 to 110° C. to an epoxide value of practically zero. After, or at the same time as this reaction, 50 to 100 mol%, preferably 95 to 100 mol%, of the phenolic hydroxyl groups are reacted with a monoepoxide compound, preferably an aliphatic monoepoxide compound. After complete reaction of the epoxide compounds, the batch is heated to 100 to 130° C., and this temperature is maintained until a viscosity minimum is reached. This process step, which is of essential importance for achieving a lower and therefore advantageous viscosity of the end product, is preferably carried out at 115 to 125° C. It is theorized that breakdown of hydrogen bridges takes place as a result of this temperature treatment. Finally, a proportion or all of the secondary hydroxyl groups of the reaction product are reacted with semi-blocked diisocyanates and/or other polyisocyanate compounds containing a free NCO-group.

The semi-blocked diisocyanates are prepared in a known manner. Thus, diisocyanates having NCO-groups of different reactivity, such as tolylene diisocyanate or isophorone diisocyanate, are preferably used. If symmetric diisocyanates, such as diphenylmethane diisocyanate, are employed, the proportion of free diisocyanate is to be kept as low as possible in order to minimize undesirable molecular enlargement. The blocking agents used are preferably aliphatic or aromatic monoalcohols, which are split-off under the stoving conditions, if appropriate in the presence of the customary catalysts. Other blocking agents are, for example, phenols, oximes, amines, unsaturated alcohols, caprolactam, and the like. Because of the procedure according to the invention, blocking agents which are split-off at a relatively low temperature can also be employed, such as butanone oxime or activated primary monoalcohols, for example diethylene glycol monobutyl ether or benzyl alcohol. Suitable polyisocyanate compounds having a free NCO-group are, for example, corresponding prepolymers of diisocyanates and polyols or allophanates, such as are obtained by an intermolecular addition reaction of semi-blocked diisocyanates under basic catalysis.

When formulating the products, it should be ensured that the end products have the required basicity to guarantee adequate stability of the aqueous solution of the binder. The introduction of this basicity, which is preferably based on tertiary amino groups, corresponding to an amine number of at least 30 mg KOH/g can be effected by using primary-tertiary diamines during the aminoalkylation, or by using corresponding amines as blocking agents for semi-blocking of the diisocyanates.

To achieve the water-dilutability, some or all of the basic groups of the reaction product are neutralized with acids, preferably with formic acid, acetic acid, or lactic acid. Neutralization of 20 to 60% of the basic groups, corresponding to an amount of about 20 to 60 millimol of acid per 100 g of solid resin, is usually sufficient for a dilutability which is suitable in practice. The binders are then diluted with deionized water to the desired concentration. If appropriate, they are processed to pigmented paints with crosslinking catalysts, pigments, extenders, and other additives before the neutralization or before the dilution or in the partly dilute state. Formulation of such paints and their use in the electrodeposition coating process are known to one skilled in the art. Curing of the coatings deposited is carried out at temperatures between 130 and 150° C. for 10 to 30 minutes.

In the event the binders do not have self-crosslinking structures to a sufficient extent, additional crosslinking components, such as blocked isocyanates, amino resins or phenolic resins, or additional components which carry hydroxyl groups, such as epoxy resin-amine adducts, can also be used. If the formulation is appropriate, the paints can also be applied by other processes, such as dipping, rolling, or spraying. The binders can be processed in organic solvents, if desired.

In a specific embodiment of the process according to the invention, paint binders which can be deposited cathodically are obtained, which can be used to formulate electrodeposition paints which result in paint films having higher coating thicknesses under the customary process conditions, so that the addition of high-boiling agents can be dispensed with. This embodiment is characterized in that (1A) an aminoalkylation product, containing on average 2 NH-groups per molecule which is obtained from 1 mol of a monoalkyl-monophenol, 2 mol of a primary alkylamine and/or primary-tertiary alkyldiamine and 2 mol of formaldehyde, (2A) is reacted with in each case 50 equivalent percent, based on the secondary amino groups present, of a monoepoxide compound and of an aliphatic and/or aromatic diepoxide compound, simultaneously or in succession, (3A) 95 to 100 mol% of the phenolic hydroxyl groups are then reacted with a monoepoxide compound, preferably an aliphatic monoepoxide compound, (4A) and after complete reaction of the epoxide groups, the batch is kept at a temperature of 100 to 130° C., preferably 115 to 125° C., until a viscosity minimum is reached, and (5A) a proportion or all of the secondary hydroxyl groups of the reaction product are reacted with semi-blocked diisocyanates or other polyisocyanate compounds containing a free NCO-group.

Monoalkylphenols having an alkyl radical containing at least 4 carbon atoms are employed for the preparation of the aminoalkylation products (component 1A).

Aliphatic monoepoxide compounds having a molecular weight of at least 180, such as the above-mentioned glycidyl esters of monocarboxylic acids and glycidyl ethers, and epoxide compounds, such as dodecene oxide, in which the epoxide group is located directly on an aliphatic chain or an aliphatic ring are the preferred monoepoxide compounds.

Particularly favorable application results are achieved if the products prepared in accordance with this specific embodiment are water-soluble to only a limited extent, even after protonation. To improve the stability of an electrodeposition bath when the products are applied by electrodeposition, such paint binders are combined with cationic epoxy resin-amine adducts which are readily water-soluble after protonation. The proportion of this combination partner is between 20 and 70% by weight, preferably between 30 and 60% by weight, based on the binder solids of the combination.

PRESENTLY PREFERRED EMBODIMENTS

The following examples illustrate the invention without limiting it in its scope. All the data in parts or percentages relate to weight units unless stated otherwise. EEW in these examples denotes epoxide equivalent weight.

Example 1: 94 parts of phenol (1 mol) are heated to 75° C. with 64 parts of 2-ethylhexylamine (0.5 mol), 65 parts of diethylaminopropylamine (0.5 mol) and 91 parts of toluene in a suitable reaction vessel. 33 parts of paraformaldehyde, 91% strength (1 mol), are then added to the batch, while cooling gently. The temperature is increased slowly until a brisk azeotropic distillation is established. After removal of 21 parts of water of reaction, the mixture is cooled to 75° C., with the addition of 450 parts of toluene, and 475 parts of a diepoxy resin based on bisphenol A and epichlorohydrin (EEW 475) are added in portions in the course of 30 to 60 minutes. The batch is kept at 95° C. until an epoxide value of zero is reached. After addition of 250 parts (1 mol) of the glycidyl ester of a saturated, tertiary $C_9$–$C_{11}$-monocarboxylic acid marketed under the trade name CARDURA® E10 by Shell, the reaction is carried out again at 95 to 110° C. to an epoxide value of practically zero.

The temperature is then increased to 120° C. in the course of 30 minutes and kept at this level until the viscosity measured, for example using a Brookfield rotary viscometer, has reached a minimum, which is the case after about 1 to 2 hours. After cooling to 60° C., 1008 parts (3 mol) of a tolylene diisocyanate semiblocked with diethylene glycol monobutyl ether are added continuously, during which the temperature is controlled so as not to exceed 90° C. After the end of the addition, the batch is stirred at 80° C. for a further 30 minutes. The solids content is 83%.

70 parts, based on 100% solids, of the end product according to Example 1 are mixed with 30 parts, on a 100% solids basis, of an epoxide-amine adduct as an additional component ZK I described below, and the mixture is stirred at 80° C. for 15 minutes. The solvent is then removed in vacuo, until a solids content of 93 to 95% is reached. After neutralization with about 30 millimol of formic acid per 100 g of solid resin, the mixture is diluted with deionized water to a solids content of about 45%, while stirring. A dispersion having a viscosity of 300 to 500 mPa.s is obtained.

Examples 2 to 8: Binders are prepared in accordance with the procedure of Example 1 in accordance with the data in Table 1.

The following abbreviations are used in the tables:

| | |
|---|---|
| EPH I | Diepoxy resin based on bisphenol A and epichlorohydrin (EEW about 475) |
| EPH II | Diepoxy resin based on bisphenol A and epichlorohydrin (EEW about 190) |
| EPH III | Diepoxy resin based on polypropylene glycol (EEW about 320) |
| ME I | Glycidyl ester of tertiary $C_9$–$C_{11}$-monocarboxylic acids (CARDURA ® E10; EEW about 250) |
| ME II | 2-Ethylhexyl monoglycidyl ether (EEW 186) |
| PH | Phenol |
| NPH | p-Nonylphenol |
| BPH | p-tert-Butylphenol |
| BPHA | Bisphenol A |
| DEAPA | Diethylaminopropylamine |
| EHA | 2-Ethylhexylamine |
| MOLA | Monoethanolamine |
| BDGL | Diethylene glycol monobutyl ether |
| BA | Benzyl alcohol |
| BOX | Butanone oxime |
| TDI | Tolylene diisocyanate (commercially available isomer mixture, 80/20) |
| DPMDI | Diphenylmethane diisocyanate |
| HCOOH | Formic acid |

Isocyanate compounds having a free NCO-group employed in the examples:

| | |
|---|---|
| IC I | TDI/BDGL |
| IC II | DPMDI/BDGL |
| IC III | DPMDI/BA |
| IC IV | TDI/BOX |
| IC V | DPMDI/BOX |
| IC VI | Allophanate, obtained by reaction of a DPMDI semiblocked with BDGL under basic catalysis (molecular weight about 1236) |
| IC VII | Allophanate based on DPMDI/BA (molecular weight about 1974) |

Table 1 is as follows:

TABLE 1

| | Aminoalkylation Product | | | | | |
|---|---|---|---|---|---|---|
| | Phenol | | Amine | | $CH_2O$ | |
| Example | Parts | (Mol) | Parts | (Mol) | Parts | (Mol) |
| 1 | 94 | (1.0) PH | 64 | (0.5) EHA | 30 | (1.0) |
| | | | 65 | (0.5) DEAPA | | |
| 2 | 220 | (1.0) NPH | 130 | (1.0) DEAPA | 30 | (1.0) |
| 3 | 150 | (1.0) BPH | 122 | (2.0) MOLA | 60 | (2.0) |
| 4 | 228 | (1.0) BPHA | 130 | (1.0) DEAPA | 30 | (1.0) |
| 5 | 220 | (1.0) NPH | 130 | (1.0) DEAPA | 30 | (1.0) |
| 6 | 220 | (1.0) NPH | 130 | (1.0) DEAPA | 30 | (1.0) |
| 7 | 220 | (1.0) NPH | 130 | (1.0) DEAPA | 60 | (2.0) |
| | | | 61 | (1.0) MOLA | | |
| 8 | 220 | (1.0) NPH | 130 | (1.0) DEAPA | 60 | (2.0) |
| | | | 61 | (1.0) MOLA | | |

| | Epoxide Compound | | | |
|---|---|---|---|---|
| | Part I | | Part II | |
| Example | Parts | (Equivalents) | Parts | (Mol) |
| 1 | 475 | (1.0) EPH I | 250 | (1.0) ME I |
| 2 | 356 | (0.75) EPH I | 250 | (1.0) ME I |
| | 47 | (0.25) EPH II | | |
| 3 | 475 | (1.0) EPH I | 186 | (1.0) ME II |
| | 250 | (1.0) ME I | | |
| 4 | 475 | (1.0) EPH I | 372 | (2.0) ME II |
| 5 | 475 | (0.75) EPH I | 250 | (1.0) ME I |
| | 80 | (0.25) EPH III | | |
| 6 | 475 | (1.0) EPH I | 250 | (1.0) ME I |
| 7 | 475 | (1.0) EPH I | 250 | (1.0) ME I |
| | 250 | (1.0) ME I | | |
| 8 | 475 | (1.0) EPH I | 186 | (1.0) ME II |
| | 186 | (1.0) ME II | | |

TABLE 1-continued

| Example | Isocyanate Compound Parts | (Mol) | Additional Component[1] | | Neutralization mMol of HCOOH/100 g of Solid Resin |
|---|---|---|---|---|---|
| 1 | 1008 | (3.0) IC I | 30 | ZK I | 30 |
| 2 | 1176 | (3.5) IC I | 30 | ZK I | 28 |
| 3 | 672 | (2.0) IC I | — | — | 50 |
|   | 522 | (2.0) IC IV | | | |
| 4 | 1253 | (3.5) IC III | 15 | ZK I | 30 |
|   |      |             | 25 | ZK II | |
| 5 | 783 | (3.5) IC IV | 10 | ZK I | 28 |
|   |     |             | 20 | ZK II | |
| 6 | 1011 | (3.0) IC V | 15 | ZK I | 30 |
|   |      |            | 15 | ZK II | |
| 7 | 3708 | (3.0) IC VI | — | — | 48 |
| 8 | 4296 | (4.0) IC VII | 20 | ZK I | 30 |
|   |      |              | 30 | ZK II | |

[1] The numerical data relate to parts (solid) in parts (solid) of the binder combination.

Example 9: 220 parts of nonylphenol (1 mol) are heated to 75° C. with 258 parts of 2-ethylhexylamine (2 mol) and 200 parts of toluene in a suitable reaction vessel. 66 parts of paraformaldehyde, 91% strength (2 mol), are then added to the batch, while cooling gently. The temperature is increased slowly until a brisk azeotropic distillation is established. After removal of 42 parts of water of reaction, the mixture is cooled to 75° C., with addition of 500 parts of toluene, and 250 parts of the glycidyl ester of saturated, tertiary $C_9$–$C_{11}$-monocarboxylic acids (CARDURA ® E10 by Shell; EEW about 250) are added in portions in the course of 30 to 60 minutes. The batch is kept at 80 to 90° C. until an epoxide value of zero is reached. After addition of 475 parts of a diepoxy resin based on bisphenol A and epichlorohydrin (EEW 475), the reaction is continued at 95 to 110° C. to an epoxide value of zero. A further 186 parts of 2-ethylhexyl monoglycidyl ether (EEW 186) are then added, and the mixture is reacted again at 95 to 110° C. to an epoxide value of zero.

The temperature is then increased to 120° C. in the course of 30 minutes and kept at this level until the viscosity, measured using a Brookfield rotary viscometer, has reached a minimum, which is the case after about 1 to 2 hours. After cooling to 60° C., 1008 parts (3 mol) of a tolylene diisocyanate semi-blocked with diethylene glycol monobutyl ether are added continuously, during which the temperature is controlled so as not to exceed 90° C. After the end of the addition, the batch is stirred at 80° C. for a further 30 minutes. The solids content is 78%. 60 parts, based on 100% solids, of the end product according to Example 9 are mixed with 40 parts, based on 100% solids, of an epoxide-amine adduct as an additional component ZK II, hereinafter described, and the mixture is stirred at 80° C. for 15 minutes. The solvent is then removed in vacuo, until a solids content of 93 to 95% is reached. After neutralization with about 32 millimol of formic acid per 100 g of solid resin, the mixture is diluted with deionized water to a solids content of about 45%, while stirring. A dispersion having a viscosity of 300 to 500 mPa.s is obtained.

Examples 10 to 16: Binders are prepared in accordance with the procedure of Example 9 in accordance with the data in Table 2. Table 2 is as follows:

TABLE 2

| | Aminoalkylation Product | | | | | | |
|---|---|---|---|---|---|---|---|
| | Phenol | | | Amine | | $CH_2O$ | |
| Example | Parts | (Mol) | | Parts | (Mol) | Parts | (Mol) |
| 9 | 220 | (1.0) | NPH | 258 | (2.0) EHA | 60 | (2.0) |
| 10 | 220 | (1.0) | NPH | 260 | (2.0) DEAPA | 60 | (2.0) |
| 11 | 150 | (1.0) | BPH | 258 | (2.0) EHA | 60 | (2.0) |
| 12 | 220 | (1.0) | NPH | 260 | (2.0) DEAPA | 60 | (2.0) |
| 13 | 150 | (1.0) | BPH | 258 | (2.0) EHA | 60 | (2.0) |
| 14 | 220 | (1.0) | NPH | 260 | (2.0) DEAPA | 60 | (2.0) |
| 15 | 220 | (1.0) | NPH | 260 | (2.0) DEAPA | 60 | (2.0) |

| | Epoxide Compound | | | | | | | | |
|---|---|---|---|---|---|---|---|---|---|
| Example | Parts | (Mol) | Part I/I | Parts | Equivalent | Part I/II | Parts | (Mol) | Part II |
| 9 | 250 | (1.0) | ME I | 475 | (1.0) | EPH I | 186 | (1.0) | ME II |
| 10 | 250 | (1.0) | ME I | 475 | (1.0) | EPH I | 186 | (1.0) | ME II |
| 11 | 186 | (1.0) | ME II | 190 | (1.0) | EPH II | 250 | (1.0) | ME I |
| 12 | 186 | (1.0) | ME II | 237 | (0.5) | EPH I | 186 | (1.0) | ME II |
| 1 |   | (1.0) |       | 95 | (0.5) | EPH II |   |   |   |
| 13 | 250 | (1.0) | ME I | 320 | (1.0) | EPH III | 250 | (1.0) | ME I |
| 14 | 250 | (1.0) | ME I | 475 | (0.75) | EPH I | 186 | (1.0) | ME II |
|   |   |   |   | 80 | (0.25) | EPH III |   |   |   |
| 15 | 184 | (1.0) | ME III | 475 | (1.0) | EPH I | 184 | (1.0) | ME III |

| Example | Isocyanate Compound Parts | (Mol) | Additional Component[1] | Neutralization mMol of HCOOH/100 g of Solid Resin |
|---|---|---|---|---|
| 9 | 1008 | (0.3) IC I | 40 ZK II | 32 |
| 10 | 1008 | (0.3) IC I | 40 ZK II | 32 |
| 11 | 1442 | (3.5) IC II | 50 ZK II | 30 |
| 12 | 1648 | (4.0) IC II | 45 ZK II | 28 |

TABLE 2-continued

| 13 | 1074 | (3.0) | IC III | 45 ZK II | 37 |
| 14 | 3780 | (3.0) | IC VI | 40 ZK II | 34 |
| 15 | 1176 | (3.5) | IC I | 45 ZK II | 35 |

[1] The numerical data relate to parts (solid) in parts (solid) of the binder combination.

Preparation of the Additional Components

ZK I: 1 mol of a diepoxy resin based on bisphenol A and epichlorohydrin (EEW about 475) is reacted with 2 mol of diethanolamine in a known manner, and cut to 70% solid in methoxypropanol or toluene.

ZK II: 1 mol of a disecondary amine is prepared from 640 parts of EPH III and 129 parts (1 mol) of 2-ethylhexylamine as well as 61 parts (1 mol) of MOLA at 80° C. by complete reaction of all the epoxide groups. 1900 parts of EPH I, dissolved in 814 parts of methoxypropanol, are added and reacted with the amine at 80° C. until the epoxide groups corresponding to the secondary amino groups have been consumed. 204 parts (2.0 mol) of dimethylaminopropylamine and 66 parts (2.0 mol) of paraformaldehyde, as well as xylene as a circulating agent for the azeotropic distillation at 90 to 140° C., are then added. After the oxazolidine formation has taken place, the xylene is removed from the reaction medium by distillation and the batch is diluted with 250 parts of ethylene glycol monobutyl ether. The hydroxyl number of primary hydroxyl groups is about 19 mg KOH/g, the calculated molecular weight is about 2960, and the solids content is 74%.

To test the binders prepared according to Examples 1 to 15, paints having a solids content of 18% and a pigment-binder ratio of 0.5:1 are prepared using the pigment paste described below and water. After a homogenization phase of 24 hours, the paints are deposited electrically onto cleaned, non-phosphated steel sheets. The deposition conditions are chosen so that the films have a dry film thickness of 22±2 μm.

The pigment paste employed consists of
1000 parts of paste resin (100% solids),
252 parts of dibutyltin oxide (as the catalyst),
421 parts of basic lead silicate,
60 parts of color carbon black, and
5519 parts of titanium dioxide.

The paste resin used is a binder which is described in EP-B1-0 209 857 (PHV 1, water-soluble after protonation, OH equivalent about 300) and is prepared in the following manner:

500 parts of an epoxy resin based on bisphenol A and epichlorohydrin (epoxide equivalent weight about 500) are dissolved in 214 parts of propylene glycol monomethyl ether and reacted with 83 parts of a monoester of phthalic anhydride and 2-ethylhexanol in the presence of 0.5 g of triethylamine as the catalyst at 110° C. to an acid number of less than 3 mg KOH/g. 120 parts of an NH-functional oxazolidine of aminoethylethanolamine, 2-ethylhexyl acrylate and formaldehyde and 26 parts of diethylaminopropylamine are then added and the batch is reacted at 80° C. to an epoxy value of practically zero. The batch is diluted with 200 parts of propylene glycol monomethyl ether to a solids content of 64%.

The stoving temperature is chosen according to the blocking agents used for the individual binders, and is 150° C. for Examples 1 to 3, 7, 9 to 12, 14 and 15 (BDGL); 145° C. for Examples 4, 8 and 13 (BA); and 130° C for Examples 5 and 6 (BOX). The stoving time is 20 minutes in all cases.

All the coatings show excellent mechanical properties including an impact test in accordance with ASTM-D-2794 of at least 80 i.p.; no flaking in the mandrel bending test in accordance with ASTM-D-522-60, and excellent corrosion resistance on steel sheet which has not been pretreated in accordance with the salt spray test in accordance with ASTM-B-117-64 where attack on the cross-cut after a test duration of 360 hours is a maximum of 2 mm.

The same results are achieved with the products prepared in accordance with EP-B1-0 209 857 only at stoving temperatures of at least 160° C.

To increase the film thicknesses which can be achieved under customary deposition conditions to 20 to 30 μm (with a faultless surface), the electrodeposition paints formulated with the products of Examples 1 to 8 prepared according to the invention require only small additions of Texanol (5% by weight, based on the solids content of the binder), while the electrodeposition paints using products according to Examples 9 to 15 can be formulated without additions of Texanol or of other high-boiling agents.

As will be apparent to one skilled in the art, various modifications can be made within the scope of the aforesaid description. Such modifications being within the ability of one skilled in the art form a part of the present invention and are embraced by the appended claims.

It is claimed:

1. Process for the preparation of self-crosslinking cationic paint binders which can be diluted with water after protonation which are based on modified aminoalkylation products of phenols, wherein (1) an aminoalkylation product, containing on average at least one NH-group per molecule, obtained from 1 mol of a member selected from the group consisting of a monoalkylphenol, a monoarylphenol, a monoarylalkylphenol and mixtures thereof having at least one phenolic hydroxyl group; 1 to 2 mol of a member selected from the group consisting of a primary alkylamine, primary alkanolamine, primary-tertiary alkyldiamine and mixtures thereof and an amount of formaldehyde equimolar to the primary amino groups, (2) is reacted with an equivalent amount of an aliphatic or aromatic diepoxide compound equal to at least one equivalent of the secondary amino groups present, and (3) after reaction of the epoxide groups in steps (1) and (2), 50 to 100 mol% of the remaining phenolic hydroxyl groups are reacted with a monoepoxide compound, and (4) after complete reaction of all epoxide groups, the reaction charge is kept at a temperature of 100 to 130° C. until a viscosity minimum is reached, and thereafter, (5) a proportion or all of the secondary hydroxyl groups of the reaction product obtained after completion of steps (1) through (4) are reacted with a semi-blocked polyisocyanate compound containing a free NCO-group.

2. Process according to claim 1 wherein in step (2) the amount of secondary amino groups is greater than 1 equivalent with respect to the diepoxide compound and the amount in excess of 1 equivalent is reacted with a monoepoxide compound.

3. Process according to claim 1 wherein butanone oxime or a primary monoalcohol are employed as blocking agents for the isocyanate compounds.

4. Process according to claim 1 wherein in step (3) 95 to 100 mol% of the phenolic hydroxyl groups are reacted with an aliphatic monoepoxide compound.

5. Process according to claim 4 wherein the reaction charge is kept at a temperature of 115 to 125° C.

6. Process according to claim 5 wherein in step (5) the polyisocyanate is a diisocyanate.

7. Process for the preparation of self-crosslinking cationic paint binders which can be diluted with water after protonation which are based on modified aminoalkylation products of phenols, wherein (1A) an aminoalkylation product, containing on average 2 NH-groups per molecule obtained from 1 mol of a monoalkylmonophenol, 2 mol of a primary alkylamine and/or primary-tertiary alkyldiamine and 2 mol of formaldehyde, (2A) is reacted in two subsequent steps with 50 equivalent percent, each based on the secondary amino groups present, of a monoepoxide compound and of a diepoxide compound, said diepoxide selected from an aliphatic or an aromatic diepoxide compound, (3A) 95 to 100 mol% of the remaining phenolic hydroxyl groups after reaction (2A) are then reacted with a monoepoxide compound, (4A) after complete reaction of all epoxide groups, the reaction product of steps (1A) through (3A) is kept at a temperature of 100 to 130° C., until a viscosity minimum is reached, and (5A) a proportion or all of the secondary hydroxyl groups of the reaction product are reacted with a semi-blocked polyisocyanate compound containing a free NCO-group.

8. Process according to claim 7 wherein the temperature in step (4A) is from 115 to 125° C. and the polyisocyanate of step (5A) is a diisocyanate.

9. Process according to claim 7 wherein monoalkylphenols having an alkyl radical containing at least carbon atoms are used as the phenols in component 1A.

10. Process according to claim 7 wherein an aliphatic monoepoxide compound is utilized which has a molecular weight of at least 180 and is selected from the group consisting of glycidyl esters of monocarboxylic acids, glycidyl ethers, and mixtures thereof.

11. Process according to claim 7 wherein primary monoalcohols are employed as blocking agents for the isocyanate compounds.

12. Process according to claim 3 wherein diethylene glycol monoalkyl ethers or benzyl alcohol are employed as the primary monoalcohols.

13. Self-crosslinking cationic paint binders which can be diluted with water after protonation and are based on modified aminoalkylation products of phenols, prepared according to any one of claims 1–12.

14. An electrodeposition paint which can be deposited cathodically comprising in combination a paint binder prepared according to any one of claims 1–3 or 9 and an additional crosslinking component which carries hydroxyl groups.

15. An electrodeposition paint which can be deposited cathodically comprising in combination a paint binder prepared according to any one of claims 7–12 and a cationic epoxy amine adduct which is water soluble after protonation.

* * * * *